United States Patent

Long, deceased

[15] 3,675,226

[45] July 4, 1972

[54] RADIO REMOTE CONTROL FOR A SLIDE PROJECTOR

[72] Inventor: J. Burton Long, deceased, late of Sarasota, Fla., by Clarice Cleland Long, 2924 Grove St., Sarasota, Fla. 33580, executrix

[22] Filed: May 4, 1970

[21] Appl. No.: 34,461

[52] U.S. Cl. ..............................343/225, 343/228, 340/171, 340/310

[51] Int. Cl. ..............................................H04b 7/00

[58] Field of Search ..........................343/225, 226, 227, 228

[56] References Cited

UNITED STATES PATENTS

| | | | |
|---|---|---|---|
| 3,348,108 | 10/1967 | Donofrio | 343/225 UX |
| 3,387,582 | 6/1968 | Reeves | 343/225 X |
| 3,475,092 | 10/1969 | Harvey | 343/225 UX |

*Primary Examiner*—Harold I. Pitts
*Attorney*—Linton & Linton

[57] ABSTRACT

The present remote control system is for rotating a drum type magazine of a slide projector. A portable radio transmitter is employed for sending a signal, when operated, to said system for presenting a different slide in the magazine to be projected by the slide projector.

2 Claims, 2 Drawing Figures

PATENTED JUL. 4 1972 3,675,226

Figures 1, 2:
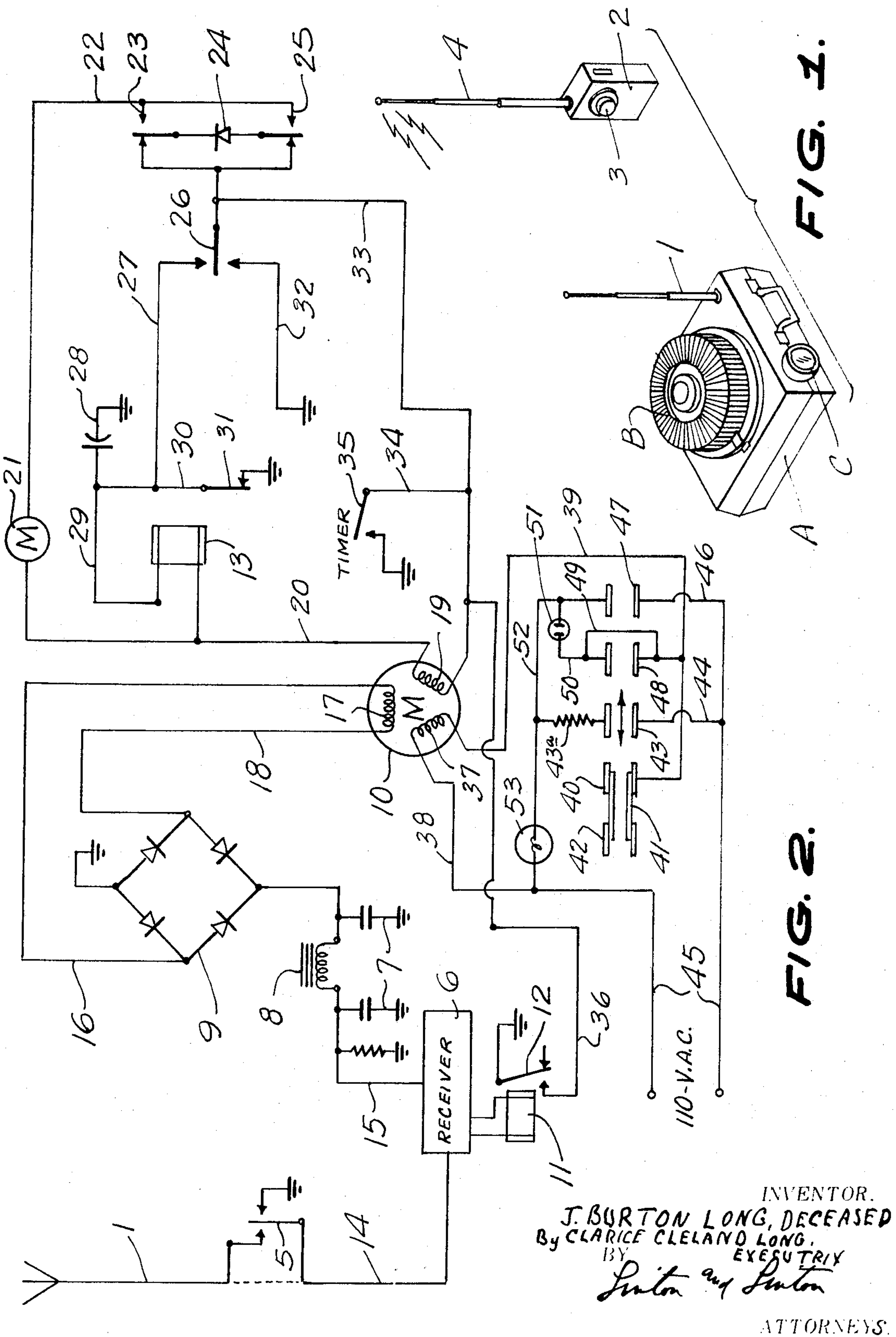

INVENTOR.
J. BURTON LONG, DECEASED
By CLARICE CLELAND LONG,
EXECUTRIX
BY
Linton and Linton
ATTORNEYS.

RADIO REMOTE CONTROL FOR A SLIDE PROJECTOR

The present invention is concerned with a remote control system for rotating a drum type magazine of a slide projector, a slide at a time.

The principal object of the present invention is to provide a system readily attachable to or as a part of slide projectors having rotatable slide magazines and which system can be operated by a radio signal sent from a transmitter to be carried and operated by a person some distances from the projector.

Further objects of the invention will be in part obvious and in part pointed out in the following detailed description of the accompanying drawing, in which, FIG. 1 is an exploded perspective view of a transmitter and slide projector incorporating the present system.

And FIG. 2 is a diagramatic view of the present system.

In FIG. 1 there is shown a slide projector A having the system of FIG. 2 included therein and which projector has a rotatable drum type magazine B for housing a plurality of picture slides to be projected a slide at a time through lens C upon the step wise rotation of magazine B. Antenna 1 is telescopically mounted on said projector and connected to the system of FIG. 2.

A portable radio transmitter 2 has a push button 3 for an operator to push and transmit a signal over the antenna 4 to antenna 1. A conventional transmitter 2 having a range of, for example, 200 feet can be used for the present purpose.

The present system includes a manually operable toggle switch 5 normally grounded, but connectable to antenna 1, a conventional radio receiver 6 which is matched with transmitter 2 and thus capable of receiving a signal from said transmitter, a filter 7, induction coil 8, a diode bridge 9 for rectifying AC current to DC, an electrical blower motor 10, a relay coil 11, switch 12 and solenoid 13.

Wire 14 connects switch 5 with receiver 6 so that when said switch is operated it will connect antenna 1 with said receiver.

Wire 15 which has filter 7 and induction coil 8 interconnected therein, also connects said receiver with bridge 9. Wire 16 connects bridge 9 with a 14 turn winding 17 added to motor 10 for receiver power. Wire 18 connects winding 17 with bridge 9.

Winding 19 of motor 10 is connected by wire 20 to the slide advance solenoid 13 which step-wise rotates magazine B. Wire 20 is also connected to the projector lens focus motor 21 which in turn is connected by wire 22 to a manual switch having reverse contacts 23, rectifier 24 and forward contacts 25. Said manual switch is connected to switch 26 with wire 27 for the reverse side being connected to wire 30 and a cycle switch 31. Wire 27 is also connected to a capacitor 28 and by wire 29 to the slide advance solenoid 13.

The forward side of switch 26 is connected by wire 32 to a ground, while wire 33 connected between said switches is connected to motor winding 19, by wire 34 to a timer 35 and by wire 36 to a pole of switch 12.

A winding 37 of motor 10 is connected by wire 38 to one wire 45 from a source of current and by wire 39 to contacts 40 of a slide switch having slideable contacts 41. Said slide switch has contacts 42, 43, 48 and 47. Contacts 43 are connected by wire 44 to one of the lead-in wires 45 from the source of current and by resistor 43*a* to wire 52. Said wire 52 connects one of said contacts 47 to the wire 38 and has lamp 53 interconnected therein. Contacts 48 are interconnected by wire 49 with one contact 48 connected to wire 39 and the other contact 48 connected by wire 50 to a receptacle 51 and wire 52.

The above described elements 12, 19 to 35, and 37 to 53 and motor 10 except for winding 17 are conventional parts of Kodak Carousel Projectors such as Model 800 thereof produced by the Eastman Kodak Company.

Winding 17 consists of fourteen turns of wire added to motor 10 to act as a step down transformer to supply power to receiver 6. The above described elements 1, 5 to 9, 11 and 12, and 14 to 18 and 36 are connected to the elements forming part of the projector and are housed therein.

In the use of the projector modified in accordance with the present invention, wires 45 are connected to a source of electrical current of 110 Volts AC, switch 5 is closed, slide contacts 41 are engaged with contacts 40 and 43, switches 25 and 26 are moved to their forward motion position whereupon the projector will project a picture of a slide in front of lens C.

When button 3 of transmitter 2 is pushed in said transmitter will transmit a signal to antenna 1 to be picked up by receiver 6 which is matched to said transmitter. Receiver 6 will then activate relay coil 11 and close switch 12 sending current to solenoid 13 which will turn magazine B to the next slide for projection through lens C. Each time button 3 is pushed a new slide in magazine B will be presented for viewing. Closing switch 23 will reverse the rotation of magazine B each time button 3 is pushed inwardly of the transmitter 2.

I claim:

1. In a magazine type projector having an electric blower motor and solenoid operated means for rotating the magazine, a remote control therefore comprising a radio transmitter, a radio receiver capable of receiving a signal from said transmitter, a winding on said motor, a diode bridge connected to said motor winding, an induction coil, a filter, said induction coil and filter being interconnected with said receiver and said diode bridge, a relay coil operatively connected to said receiver, a normally open switch closeable by said relay coil and connected when closed to the solenoid for rotating the magazine and means for connecting the motor to a source of current.

2. In a magazine type projector having an electric blower motor and solenoid operated means for rotating the magazine, a remote control therefore as claimed in Claim 1 including an antenna for said receiver and a normally grounded switch interconnected between said antenna and said receiver.

* * * * *